United States Patent
Tull

(10) Patent No.: US 9,841,942 B2
(45) Date of Patent: Dec. 12, 2017

(54) METHOD OF AUGMENTING AN AUDIO CONTENT

(71) Applicant: PowerChord Group Limited, Exeter, Devon (GB)

(72) Inventor: Graham Tull, Devon (GB)

(73) Assignee: POWERCHORD GROUP LIMITED, Exeter (GB)

(\*) Notice: Subject to any disclaimer, the term of this patent is extended or adjusted under 35 U.S.C. 154(b) by 0 days.

(21) Appl. No.: 15/049,349

(22) Filed: Feb. 22, 2016

(65) Prior Publication Data

US 2017/0017460 A1    Jan. 19, 2017

(30) Foreign Application Priority Data

Jul. 16, 2015   (GB) .................................... 1512444

(51) Int. Cl.
*G06F 3/16*   (2006.01)
*H04R 27/00*  (2006.01)

(52) U.S. Cl.
CPC .............. *G06F 3/165* (2013.01); *G06F 3/162* (2013.01); *H04R 27/00* (2013.01);
(Continued)

(58) Field of Classification Search
CPC ........... H04S 7/30; H04S 3/008; H04R 1/403; G01H 7/00; H04H 60/04; H03G 3/3089; G06F 3/165
(Continued)

(56) References Cited

U.S. PATENT DOCUMENTS 5,822,440 A   10/1998  Oltman et al.
7,995,770 B1   8/2011  Simon
(Continued)

FOREIGN PATENT DOCUMENTS

CN        2904481 Y        5/2007
DE   10 2008 033599 A1    1/2010
(Continued)

OTHER PUBLICATIONS

Internatioal Search Report dated Oct. 13, 2015 issued in corresponding United Kingdom Application No. GB1512450.6.
(Continued)

*Primary Examiner* — Mohammad Islam
(74) *Attorney, Agent, or Firm* — Morris & Kamlay LLP

(57) ABSTRACT

A method of augmenting an ambiently experienced audio content is provided, the method comprises recording an acoustic audio signal from the ambiently experienced audio content; receiving a wireless signal comprising a first audio signal and a second audio signal, the wireless signal received using a first wireless communication system, wherein the first audio signal comprises sound that is also audible within the ambiently experienced audio content and the second audio signal comprises sound that is substantially inaudible within the ambiently experienced audio content; comparing the first audio signal with the acoustic audio signal to determine a delay between the acoustic audio signal and the first audio signal; delaying the second audio signal by the determined delay; and reproducing the delayed second audio signal at an audible volume, such that it is substantially synchronized with the ambiently experienced audio content. A device and system for augmenting the ambiently experienced audio content are also provided.

15 Claims, 3 Drawing Sheets

(52) U.S. Cl.
CPC .... *H04R 2227/007* (2013.01); *H04R 2420/07* (2013.01); *H04R 2430/01* (2013.01); *H04R 2430/03* (2013.01)

(58) Field of Classification Search
USPC ...... 381/161, 310, 58, 107, 303, 17; 700/94; 1/1
See application file for complete search history.

(56) References Cited

U.S. PATENT DOCUMENTS

| | | | |
|---|---|---|---|
| 8,588,432 | B1 | 11/2013 | Simon |
| 9,411,882 | B2 * | 8/2016 | Cory ............... H04S 7/30 |
| 2003/0007648 | A1 * | 1/2003 | Currell ............ H04S 7/30 381/61 |
| 2003/0063760 | A1 | 4/2003 | Cresci et al. |
| 2007/0269062 | A1 * | 11/2007 | Rodigast ............ H04R 1/403 381/310 |
| 2008/0071402 | A1 | 3/2008 | Igoe |
| 2009/0220104 | A1 | 9/2009 | Allison |
| 2010/0150359 | A1 * | 6/2010 | KnicKrehm ........... G01H 7/00 381/58 |
| 2012/0059492 | A1 * | 3/2012 | Radford ............ H04H 60/04 700/94 |
| 2012/0087507 | A1 | 4/2012 | Meyer |
| 2012/0195445 | A1 | 8/2012 | Inlow |
| 2012/0288121 | A1 * | 11/2012 | Matsui ............... H03G 3/3089 381/107 |
| 2014/0133683 | A1 * | 5/2014 | Robinson ............ H04S 3/008 381/303 |
| 2014/0328485 | A1 * | 11/2014 | Saulters ............. G06F 3/165 381/17 |

FOREIGN PATENT DOCUMENTS

| | | |
|---|---|---|
| EP | 2007045 A2 | 12/2008 |
| EP | 2658209 A2 | 10/2013 |
| GB | 2436193 A | 9/2007 |
| WO | WO-94/04010 A1 | 2/1994 |
| WO | WO-2006/049370 A1 | 5/2006 |
| WO | WO-2013/083133 A1 | 6/2013 |

OTHER PUBLICATIONS

International Search Report dated Oct. 19, 2015 issued in corresponding United Kingdon Patent Application No. 1512444.9.
Combined International Search and Examination Report dated Jan. 29, 2016 issued in corresponding United Kingdom Patent Application No. 1512457.1.
International Search Report and Written Opinion for PCT/GB2016/052142 dated Oct. 5, 2015.
International Search Report and Written Opinion for PCT/GB2016/052139 dated Oct. 10, 2016.
International Search Report and Written Opinion for PCT/GB2016/0521326 dated Oct. 20, 2016.
Office Action dated Aug. 22, 2017 as received in GB Application No. 1512457.1.

* cited by examiner

METHOD OF AUGMENTING AN AUDIO CONTENT

CROSS-REFERENCE TO RELATED APPLICATIONS

This application claims the benefit and priority of United Kingdom Patent Application No. 1512444.9 filed on Jul. 16, 2015. The entire disclosure of the above application is incorporated herein by reference.

The subject application includes subject matter similar to U.S. patent application Ser. No. 15/049,342, entitled "Synchronising an Audio Signal", filed concurrently herewith; and U.S. patent application Ser. No. 15/049,393, entitled "Personal Audio Mixer", filed concurrently herewith, both of which are incorporated herein by reference.

FIELD

The present disclosure relates to a method and apparatus for augmenting an audio content.

BACKGROUND

Music concerts and other live events are increasingly being held in large venues such as stadiums, arenas and large outdoor spaces such as parks. With increasingly large venues being used, the challenge of providing a consistently enjoyable audio experience to all attendees at the event, regardless of their location within the venue, is becoming increasingly challenging.

All attendees at such events expect to experience a high quality of sound, which is either heard directly from the acts performing on the stage, or reproduced from speaker systems at the venue. Multiple speaker systems distributed around the venue may often be desirable to provide a consistent sound quality and volume for all audience members.

In some cases such systems may be unreliable and reproduction of the sound may be distorted. If multiple instrumentalists and/or vocalists are performing simultaneously on the stage, it may be very challenging to ensure the mix of sound being projected throughout the venue is correctly balanced in all areas. This may result in certain instrumentalists or vocalists being inaudible in certain areas of the audience.

SUMMARY

According to an aspect of the present disclosure, there is provided a method of augmenting an ambiently experienced audio content, the method comprising: recording an acoustic audio signal from the ambiently experienced audio content, for example, using a sound transducer, e.g. a microphone; receiving a wireless signal comprising a first audio signal and a second audio signal, the wireless signal received using a first wireless communication system, wherein the first audio signal comprises sound that is also audible or clearly audible within the ambiently experienced audio content and the second audio signal comprises sound that is substantially inaudible or not clearly audible within the ambiently experienced audio content; comparing the first audio signal with the acoustic audio signal to determine a delay between the acoustic audio signal and the first audio signal; delaying the second audio signal by the determined delay; and reproducing the delayed second audio signal at an audible or clearly audible volume, such that it is substantially synchronised with the ambiently experienced audio content.

The first audio signal may be configured to correspond to the ambiently experienced audio content.

The method may further comprise: delaying the first audio signal by the determined delay; adjusting the relative volumes of the first and second audio signals according to an audio content setting; and reproducing the delayed first and second audio signals at the adjusted volumes, such that they are substantially synchronised with the ambiently experienced audio content.

The wireless signal may further comprise one or more additional audio signals. The method may further comprise: delaying the one or more additional audio signals by the determined delay; adjusting the volumes of the one or more additional audio signals, relative to the first and second audio signals, according to the audio content setting; and reproducing the delayed one or more additional audio signals at the adjusted volumes, such that they are substantially synchronised with the ambiently experienced audio content.

The method may further comprise receiving the audio content setting from a user interface device using a second wireless communication system. The first wireless communication system may have a longer range than the second wireless communication system.

The wireless signal may comprise a multiplexed audio signal. The wireless signal may be a digitally modulated signal, e.g. a digital radio signal. The method may further comprise demuiltiplexing and/or demodulating, e.g. decoding, the wireless signal.

The method may further comprise receiving authentication data. The authentication data may indicate that a user is authorised to attend and/or watch and/or listen to a performance. The authentication data may be required to perform one or more of receiving the wireless audio signal, demodulating the wireless audio signal, demultiplexing the wireless audio signal, decoding the wireless audio signals, delaying the audio signals and reproducing one or more audio signals.

The method may further comprise providing the ambiently experienced audio content, e.g. using a speaker system.

According to another aspect of the present disclosure, there is provided an audio synchroniser comprising: a wireless receiver configured to receive a wireless signal comprising two or more audio signals; and a controller configured to perform the method according to a previously mentioned aspect of the disclosure.

According to another aspect of the present disclosure, there is provided a system for augmenting an ambiently experienced audio content, the system comprising: a speaker system configured to provide the ambiently experienced audio content; an audio workstation configured to generate a transmittable signal comprising two or more audio signals, wherein at least one of the audio signals comprises sound that may also be audible within the ambiently experienced audio content, and at least one of the audio signals comprises sound that may be at a substantially inaudible volume within the ambiently experienced audio content; a transmitter configured to transmit the transmittable signal using a first wireless communication system; and an audio synchroniser. The synchroniser may comprise the synchroniser according to a previously mentioned aspect of the disclosure.

The audio workstation may be further configured to generate at least one of the audio signals from a plurality of audio channels provided to the audio workstation. At least one of the audio signals may correspond to the ambiently experienced audio content.

To avoid unnecessary duplication of effort and repetition of text in the specification, certain features are described in relation to only one or several aspects or embodiments of the disclosure. However, it is to be understood that, where it is technically possible, features described in relation to any aspect or embodiment of the disclosure may also be used with any other aspect or embodiment of the disclosure.

DRAWINGS

For a better understanding of the present disclosure, and to show more clearly how it may be carried into effect, reference will now be made, by way of example, to the accompanying drawings, in which.

DETAILED DESCRIPTION

Figure 1:
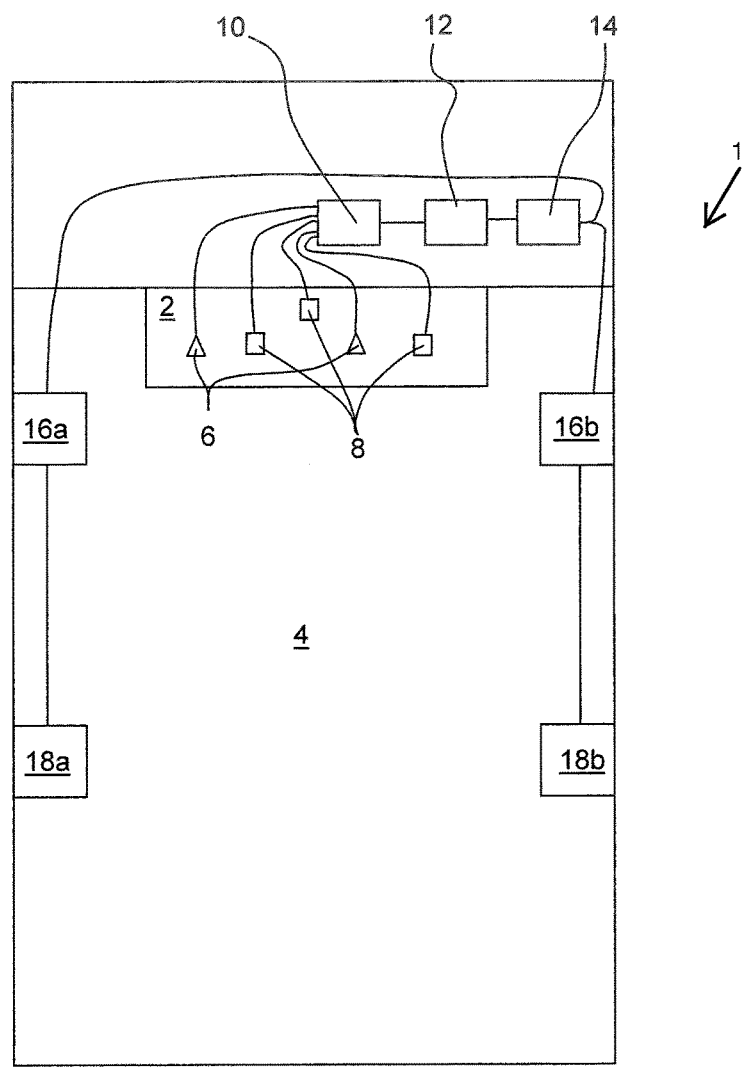
FIG. 1 is a schematic view of a previously proposed arrangement of sound recording, mixing and reproduction apparatus for a large outdoor event.

With reference to FIG. 1, a venue for a concert or other live event comprises a performance area, such as a stage 2, and an audience area 4. The audience area may comprise one or more stands of seating in a venue such as a theatre or arena. Alternatively, the audience area may be a portion of a larger area such as a park, within which it is desirable to see and/or hear a performance on the stage 2. In some cases the audience area 4 may be variable, being defined by the crowd of people gathered for the performance.

Figure 2:
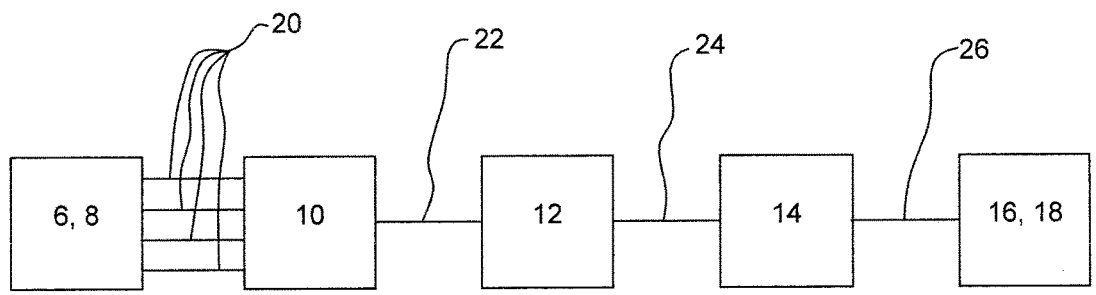
FIG. 2 is a schematic view showing the process of recording, processing and reproducing sound within the arrangement shown in FIG. 1.

With reference to FIGS. 1 and 2, the sound produced by instrumentalists and vocalists performing on the stage 2 is picked up by one or more microphone 6 and/or one or more instrument pick-ups 8 provided on the stage 2. The microphones 6 and pick-ups 8 convert the acoustic audio into a plurality of audio signals 20. The audio signals 20 from the microphones 6 and pick-ups 8 are input as audio channels into a stage mixer 10, which adjusts the relative volumes of each of the channels.

The relative volumes of each of the audio channels mixed by the stage mixer 10 are set by an audio technician prior to and/or during the performance. The relative volumes may be selected to provide what the audio technician considers to be the best mix of instrumental and vocal sounds to be projected throughout the venue. In some cases performers may request that the mix is adjusted according to their own preferences.

The mixed, e.g. combined, audio signal 22 output by the stage mixer 10 is input into a stage equaliser 12, which can be configured to increase or decrease the volumes of certain frequency ranges within the mixed audio signal. The equalisation settings may be selected by the audio technician and/or performers according to their personal tastes and may be selected according to the acoustic environment of the venue and the nature of the performance.

The mixed and equalised audio signal 24 is then input to a stage amplifier 14 which boosts the audio signal to provide an amplified signal 26, which is provided to one or more front speakers 16a, 16b to project the audio signal as sound. Additional speakers 18a, 18b are often provided within the venue to project the mixed and equalised audio to attendees located towards the back of the audience area 4. Sound from the front speakers 16a, 16b reaches audience members towards the back of the audience areas 4 a short period of time after the sound from the additional speaks 18a, 18b. In large venues, this delay may be detectable by the audience members and may lead to echoing or reverb type effects. In order to avoid such effects, the audio signal provided to the additional speakers 18a 18b is delayed before being projected into the audience area 4. The signal may be delayed by the additional speakers 18a, 18b, the stage amplifier 14, or any other component or device within the arrangement 1. Sound from the speakers 16a, 16b and the additional speakers 18a, 18b will therefore reach an attendee towards the rear of the audience area 4 at substantially the same time, such that no reverb or echoing is noticeable.

Due to the mixed and equalised sounds being reproduced by multiple speaker systems throughout the venue, some of which are configured to delay the signal before reproducing the sound, interference may occur between the projected sounds waves in certain areas of the venue which deteriorates the quality of audible sound. For example, certain instruments and/or vocalists may become indistinguishable or inaudible within the overall sound. In addition to this, the acoustic qualities of the venue may vary according to the location within the venue and hence the equalisation of the sound may be disrupted for some audience members. For example, the bass notes may become overly emphasised and/or the treble notes may become substantially inaudible.

If the audience area comprises an area of a park or another public area, which is not secured against public access, there may be people in or around the audience area who are not authorised to attend the performance. For example, they may not have a ticket for the performance. If public access to the audience area cannot be prevented, e.g. by enforcing ticketed access to the venue, the stage mix projected from the speakers may be deliberately configured such that it does not comprise all of the audio channels input to the stage mixer. For example, the stage mix may not comprise audio channels from one or more vocalists and/or lead instrumentalists performing on the stage 2. Additionally or alternatively, only the audio in a certain frequency range may be provided within the stage mix projected from the speakers. For example, the stage mix may only comprise audio below a certain frequency. By using the arrangement 100, as described below, authorised attendees may be able to listen to all channels of audio recorded from the stage and/or all frequency ranges of the audio, as described in detail below.

Figure 3:
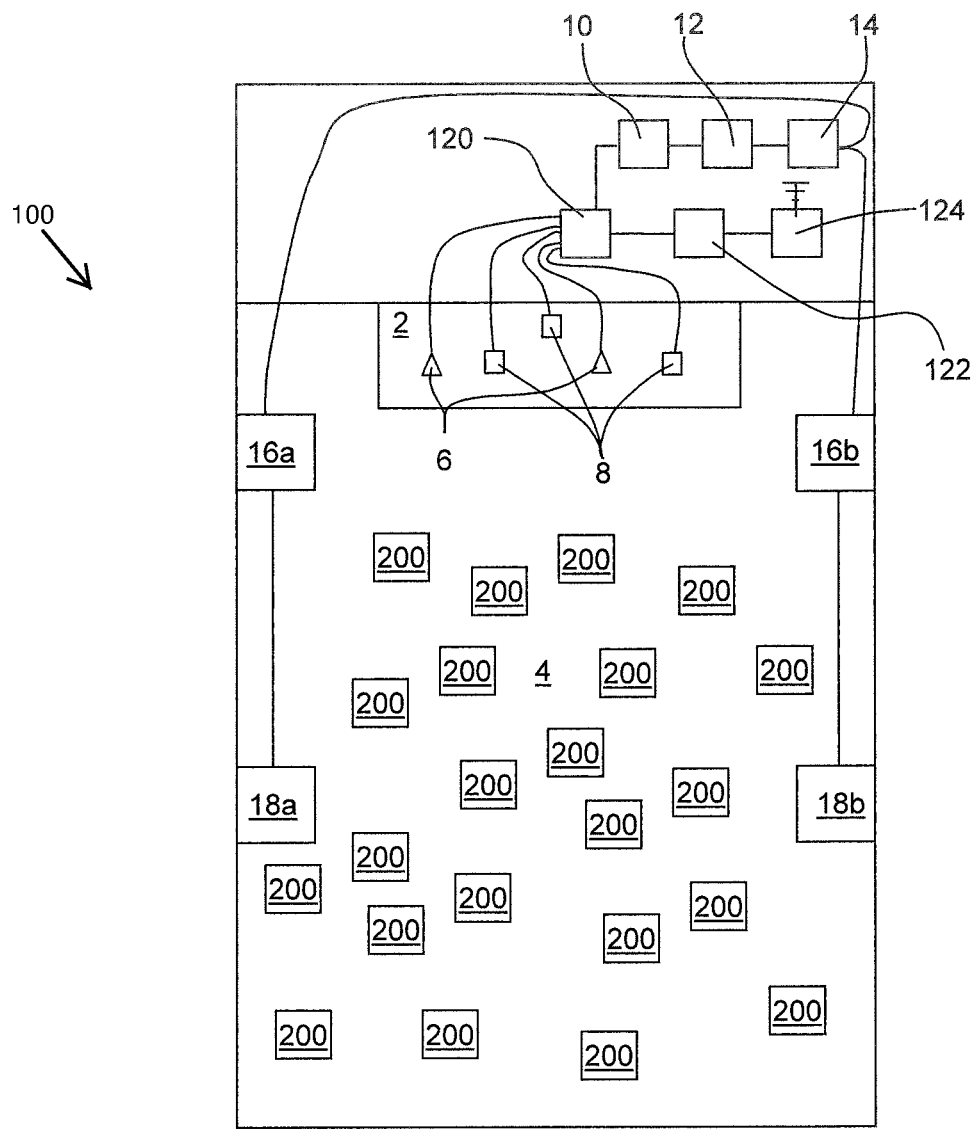
FIG. 3 is a schematic view of an arrangement of sound recording, mixing and reproduction apparatus, according to an embodiment of the present disclosure, for a large outdoor event.
Figure 4:
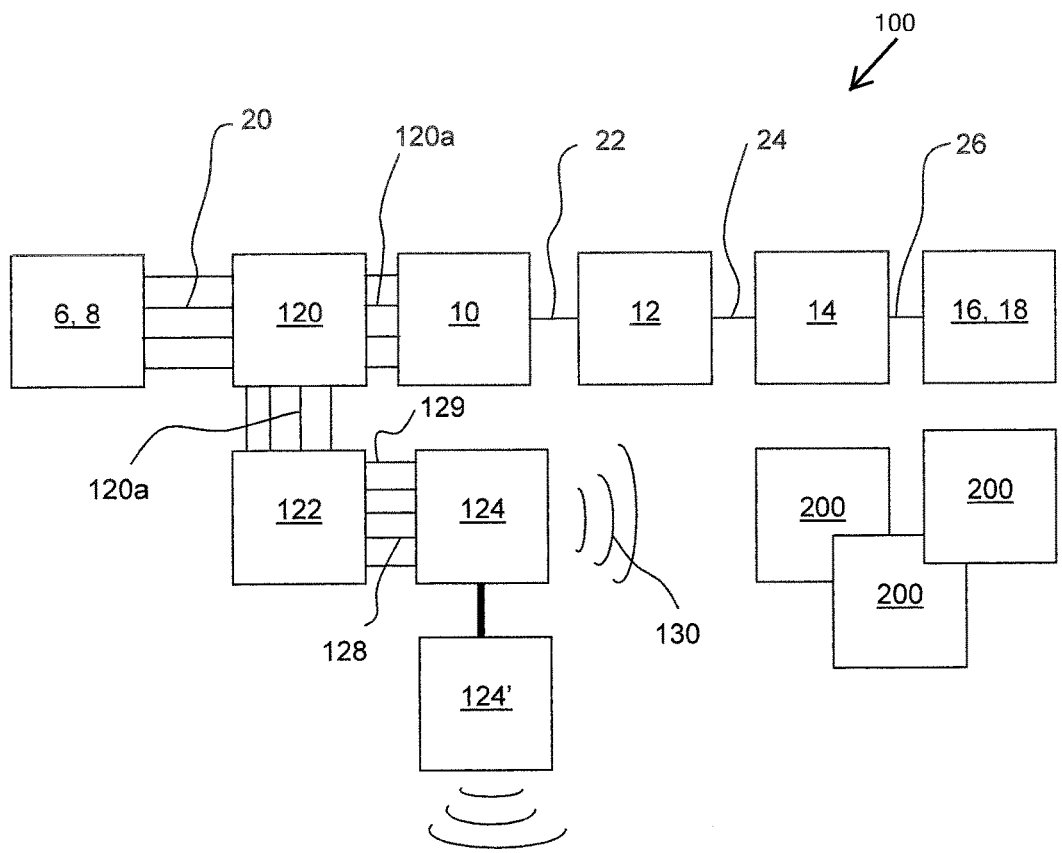
FIG. 4 is a schematic view showing the process of recording, processing and reproducing sound within the arrangement shown in FIG. 3.

With reference to FIGS. 3 and 4, in order to provide an improved quality and consistency of audio experienced by each authorised audience member attending a performance, and to allow the mix and equalisation of the audio to be individually adjusted by each audience member, an arrangement 100 of sound recording, mixing and reproduction apparatus, according to an embodiment of the present invention, is provided. The apparatus within the arrangement 100 is configured to record, mix and reproduce audio signals following a process.

The arrangement 100 comprises the microphones 6, instrument pick-ups 8, stage mixer 10, stage equaliser 12 and stage amplifier 14, which provide audio signals to drive the front speakers 16a, 16b and additional speakers 18a, 18*b*, as described above with reference to the arrangement 1. The arrangement 100 further comprises a stage audio splitter 120, an audio workstation 122, a multi-channel transmitter 124 and a plurality of personal audio mixing devices 200.

The stage audio splitter 120 is configured to receive the audio signals 20 from each of the microphones 6 and instrument pick-ups 8, and split the signals to provide inputs 120*a* to the stage mixer 10 and the audio workstation 122. The inputs 120*a* received by the stage mixer 10 and the audio workstation 122 are substantially the same as each other, and are substantially the same as the inputs 20 received by the stage mixer 10 in the arrangement 1, described above. This allows the stage mixer 10 and components which receive their input from the stage mixer 10 to operate as described above.

The audio workstation 122 comprises one or more additional audio splitting and mixing devices, which are configured such that each mixing device is capable of outputting a combined audio signal 128 comprising a different mix of each of the audio channels 120*a*, e.g. the relative volumes of each of the audio signals 120*a* within each of the combined audio signals 128 are different to within each of the other combined audio signals 128 output by the audio workstation 122. The audio workstation 122 may comprise a computing device, or any other system capable of processing the audio signal inputs 120*a* from the stage audio splitter 120 to generate the plurality of combined audio signals 128.

The combined audio signals 128 output by the audio workstation 122 are input to a multi-channel audio transmitter 124. The multi-channel audio transmitter 124 is configured to transmit the combined audio signals 128 using wireless communication, such as radio, digital radio, Wi-Fi (such as RTM), or any other wireless communication method. The multi-channel audio transmitter 124 is also capable of relaying the combined audio signal to one or more further multi-channel audio transmitter 124' using a wired or wireless communication method. Relaying the combined audio signals allows the area over which the combined audio signal is transmitted to be extended.

Each of the combined audio signals 128 may be transmitted separately using a separate wireless communication channel, bandwidth, or frequency. Alternatively, the combined audio signals 128 may be modulated, e.g. digitally modulated, and/or multiplexed together and transmitted using a single communication channel, bandwidth or frequency. For example, the combined audio signals 128 may be encoded using a Quadrature Amplitude Modulation (QAM) technique, such as 16-bit QAM. The audio signals transmitted by the multi-channel audio transmitter 124 are received by the plurality of personal audio mixing devices 200.

Figure 5:
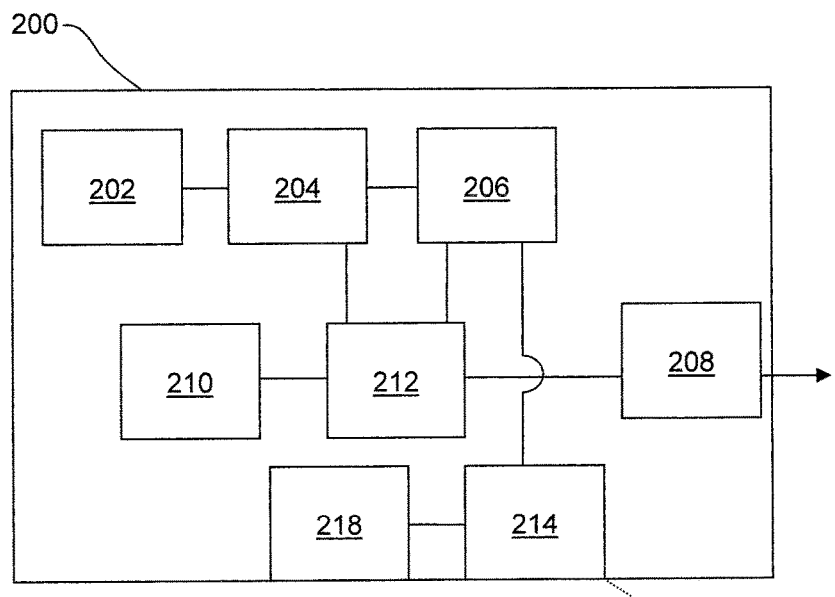
FIG. 5 is a schematic view of a system for mixing a custom audio content according to an example of the present disclosure.

With reference to FIG. 5, the personal audio mixing devices 200, according to an arrangement of the present disclosure, comprise an audio signal receiver 202, a decoder 204, a personal mixer 206, and a personal equaliser 208.

The audio signal receiver 202 is configured to receive the combined audio signals 128 transmitted by the multi-channel transmitter 124. As described above, the multi-channel transmitter 124 may encode the signal, for example using a QAM technique. Hence, the decoder 204 may be configured to decode and/or demodulate the received signal as necessary to recover each of the combined audio signals 128.

As described above, the combined audio signals 128 each comprise a different mix of audio channels 20 recorded from the instrumentalists and/or vocalists performing on the stage 2. For example, a first combined audio signal may comprise a mix of audio channels in which the volume of the vocals has been increased with respect to the other audio channels 20; in a second combined audio signal the volume of an audio channel from the instrument pick-up of a lead guitarist may be increased with respect to the other audio channels 20. The combined audio signals 128 are provided as inputs to the personal mixer 206.

The personal mixer 206 may be configured to vary the relative volumes of each of the decoded and/or demodulated combined audio signals. The mix created by the personal mixer 206 may be selectively controlled by a user of the personal audio mixer device 200, as described below.

The user may use the personal mixer 206 to select a single combined audio signal 128 to listen to. The user may select a combined audio signal which comprises an audio channel from a particular performer, e.g. in which the particular channel is boosted relative to the other audio channels. For example, if the user is not able to hear a particular performer in an ambient sound being heard from the speakers, e.g. the performer is substantially inaudible in the ambiently experienced audio, the user may select a combined audio signal in which the audio from the particular performer has been boosted. Alternatively, if the speaker systems 16, 18 at the venue are not projecting sound recorded from all the stage audio channels, the user may use the personal mixer 206 to select a combined audio channel comprising the audio channels which are not present in the stage mix, and hence cannot be heard in the ambient audio content received from the speakers. Alternatively again, the user may set the personal mixer 206 to create a mix of one or more of the combined audio signals 128.

In a particular arrangement, each of the combined audio signals 128 is mixed by the audio workstation 122 such that each signal comprises a single audio channel 20 recorded from one microphone 6 or instrument pick-up 8. The personal mixer 206 can therefore be configured by the user to provide a unique personalised mix of audio from the performers on the stage 2. The personal audio mix may be configured by the user to improve or augment the ambient sound, e.g. from the speakers and additional speakers 16, 18, heard by the user.

The mixed audio signal output from the personal mixer 206 is processed by a personal equaliser 208. The personal equaliser is similar to the stage equaliser described above and allows the volumes of certain frequency ranges within the mixed audio signal to be increased or decreased. The personal equaliser 208 may be configured by the user of the personal audio mixer device 200 according to their own listening preferences.

The equalised audio signal from the personal equaliser 208 is output from the personal mixer device 200 and may be converted to sound, e.g. by a set of personal head phones or speakers (not shown), allowing the user, or a group of users, to listen to the personal audio content created on the personal audio mixing device 200.

Each authorised member of the audience may use their own personal audio mixing device 200 to listen to a personal audio content at the same time as listening to the stage mix being projected by the speakers 16 and additional speakers 18. The audio reproduction of the performance provided by the personal audio mixing device 200 may be configured as desired by the user to complement or augment the sound being heard from the speaker systems 16, 18. For example, the personal audio content may be configured to comprise the audio channels from the performers which are not being projected by the speakers 16, 18. Alternatively, the personal audio content may be configured by the user to comprise a sound which is inaudible or substantially inaudible, within the ambient sound the user is experiencing.

In order for the user of the personal audio mixing device 200 to configure the personal mixer 206 and personal equaliser 208 according to their preferences, the personal audio mixing device 200 may comprise one or more user input devices, such as buttons, scroll wheels, or touch screen devices (not shown). Additionally or alternatively, the personal audio mixing device 200 may comprise a user interface communication module 214.

As shown in FIG. 5, the user interface communication module 214 is configured to communicate with a user interface device 216. The user interface device 216 may comprise any portable computing device capable of receiving input from a user and communicating with the user interface communication module 214. For example, the user interface device 216 may be a mobile telephone or tablet computer. The user interface communication module 214 may communicate with the user interface device 216 using any form of wired or wireless communication methods. For example, the user interface communication module 214 may comprise a Bluetooth communication module and may be configured to couple with, e.g. tether to, the user interface device 216 using Bluetooth.

The user interface device 216 may run specific software, such as an app, which provides the user with a suitable user interface, such as a graphical user interface, allowing the user to easily adjust the settings of the personal mixer 206 and personal equaliser 208. The user interface device 216 communicates with the personal audio mixer device 200 via the user interface communication module 214 to communicate any audio content settings, which have been input by the user using the user interface device.

The user interface device 216 and the personal audio mixing device 200 may communicate in real time to allow the user to adjust the mix and equalisation of the audio delivered by the personal audio mixing device 200 during the concert. For example, the user may wish to adjust the audio content settings according to the performer or the stage on a specific song being performed.

The personal audio mixer device 200 also comprises a Near Field Communication (NFC) module 218. The NFC module 218 may comprise an NFC tag which can be read by an NFC reader provided on the user interface device 216. The NFC tag may comprise authorization data which can be read by the user interface device 216, to allow the user interface device to couple with the personal audio mixing device 200. Additionally or alternatively, the authorization data may be used by the user interface device 216 to access another service provided at the performance venue.

Additionally or alternatively, the NFC module 218 may comprise an NFC radio. The radio may be configured to communicate with the user interface device 216 to receive an audio content setting from the user interface device 216. Alternatively, the NFC radio may read an audio content setting from another source such as an NFC tag provided on a concert ticket, or smart poster at the venue.

As mentioned above, the personal audio mixer device 200 may allow authorised audience members to listen to all channels of audio recorded by the performers on the stage. In order to ensure that only authorised audience members may use the service, authentication data may be required by the personal audio mixer device 200 to allow the personal audio mixer to reproduce one or more of the received audio channels. The personal mixer device 200 may require the authentication data to perform any of the functions described above. For example, the personal audio mixer device 200 may require authentication data to decode and recover one or more of the combined audio signals. The personal audio mixer device 200 may receive the authentication data from the user interface device 216 using the user interface communication module 214 or the NFC module 218. Alternatively, the personal audio mixer device 200 may receive authentication data from another source, for example by reading an NFC tag provided on the ticket for the performance.

The personal audio mixer device 200 further comprises a microphone 210. The microphone may be a single channel microphone. Alternatively the microphone 210 may be a stereo or binaural microphone. The microphone 210 is configured to record the ambient sound at the location of the user, for example the microphone 210 may record the sound received from the speakers 16 and additional speakers 18 at the user's location. The sound is converted by the microphone 210 to an acoustic audio signal.

The acoustic audio signal is input to an audio processor 212. In the arrangement shown in FIG. 5, the audio processor 212 is provided between the personal mixer 206 and the personal equaliser 208, e.g. the audio processor 212 receives the mixed audio signal from the personal mixer 206 and outputs a signal to the personal equaliser 208.

The audio processor 212 analyses the waveform of the mixed audio signal, and the waveform of the acoustic signal to determine a delay between the acoustic audio signal recorded by the microphone 210 and the mixed audio signal received from the personal mixer 206. The audio processor 212 delays the mixed audio signal by the determined delay and outputs the delayed mixed audio channel to the personal equaliser 208. In this way, the personal audio content being created on the personal audio mixer device 200 may be synchronised with the ambient audio being heard by the user from the speakers 16, 18.

One or more of the decoded audio channels may comprise audio channels which have been recorded on the stage, but are not present in the stage mix being projected from the speakers 16, 18. Hence, the mixed audio signal provided by the personal mixer 206 may comprise sound which is substantially inaudible within the acoustic audio signal recorded by the microphone 210, e.g. it may be substantially inaudible within the ambient audio environment of the user. When the mixed audio signal is not audible within the ambient audio environment of the user and hence is not present in the acoustic audio signal recorded by the microphone 210, in order to allow the mixed audio signal to be appropriately delayed, the audio processor 212 may be configured to receive one or more decoded audio channels from the decoder 204. The audio processor 212 may consider each of the decoded audio signals in order to determine the delay. Alternatively, the audio processor 212 may consider a particular decoded audio channel, which comprises a sound which is substantially audible within the ambient audio content. For example the audio processor may consider a decoded audio channel that has been configured by the audio workstation 122 to correspond to the mix of audio signals being projected by the speakers 16 and additional speakers 18.

It will be appreciated that the personal audio mixing device 200 may comprise one or more controllers configured to perform the functions of one or more of the audio signal receiver 202, the decoder 204, the personal mixer 206, the personal equaliser 208, the user interface communication module 214 and the audio processor 212, as described above. The controllers may comprise one or more modules. Each of the modules may be configured to perform the functionality of one of the above-mentioned components of the personal audio mixing device 200. Alternatively, the functionality of one or more of the components mentioned above may be split between the modules or between the controllers. Furthermore, the or each of the modules may be mounted in a common housing or casing, or may be distributed between two or more housings or casings.

Although the disclosure has been described by way of example, with reference to one or more examples, it is not limited to the disclosed examples and other examples may be created without departing from the scope of the disclosure, as defined by the appended claims.

What is claimed is:

1. A method of augmenting an ambiently experienced audio content, the method comprising:
   recording an acoustic audio signal from the ambiently experienced audio content using a microphone;
   receiving a wireless signal comprising a first audio signal and a second audio signal, the wireless signal received using a first wireless communication system, wherein the first audio signal comprises sound that is also audible within the ambiently experienced audio content and the second audio signal comprises sound that is inaudible within the ambiently experienced audio content;
   comparing the first audio signal with the acoustic audio signal to determine a delay between the acoustic audio signal and the first audio signal;
   delaying the second audio signal by the determined delay; and
   reproducing the delayed second audio signal at an audible volume, such that it is substantially synchronized with the ambiently experienced audio content.

2. The method of claim 1, wherein the method further comprises:
   delaying the first audio signal by the determined delay;
   adjusting the relative volumes of the first and second audio signals according to an audio content setting; and
   reproducing the delayed first and second audio signal at the adjusted volumes, such that they are substantially synchronized with the ambiently experienced audio content.

3. The method of claim 2, wherein the wireless signal further comprises one or more additional audio signals, wherein the method further comprises:
   delaying the one or more additional audio signals by the determined delay;
   adjusting the volumes of the one or more additional audio signals relative to the first and second audio signals according to the audio content setting; and
   reproducing the delayed one or more additional audio signals at the adjusted volumes, such that they substantially synchronized with the ambiently experienced audio content.

4. The method of claim 2, wherein the method further comprises receiving the audio content setting from a user interface device using a second wireless communication system.

5. The method of claim 4, wherein the first wireless communication system has a longer range than the second wireless communication system.

6. The method of claim 1, wherein the wireless signal comprises a multiplexed audio signal; and
   wherein the method further comprises demultiplexing the wireless signal.

7. The method of claim 1, wherein the wireless signal is a digitally modulated signal.

8. The method of claim 1, wherein the first audio signal is configured to correspond to the ambiently experienced audio content.

9. The method of claim 1, wherein the method further comprises receiving authentication data.

10. The method of claim 9, wherein the authentication data is required to receive the wireless audio signal and/or to reproduce one or more delayed audio signals.

11. The method of claim 1, wherein the method further comprises providing the ambiently experienced audio content.

12. An audio synchronizer comprising:
   a wireless receiver configured to receive a wireless signal comprising two or more audio signals; and
   a controller configured to perform the method of claim 1.

13. A system for augmenting an ambiently experienced audio content, the system comprising:
   a speaker system configured to provide the ambiently experienced audio content;
   an audio workstation configured to generate a transmittable signal comprising two or more audio signals, wherein at least one of the audio signals comprises sound that is also audible within the ambiently experienced audio content, and at least one of the audio signals comprises sound that is inaudible within the ambiently experienced audio content;
   a transmitter configured to transmit the transmittable signal using a first wireless communication system; and
   the audio synchronizer of claim 12.

14. The system of claim 13, wherein the audio workstation is further configured to generate at least one of the audio signals from a plurality of audio channels provided to the audio workstation.

15. The system of claim 13, wherein at least one of the audio signals corresponds to the ambiently experienced audio content.

* * * * *